April 21, 1964  T. A. MILLER ETAL  3,129,858
MEASURING AND DISPENSING APPARATUS
Filed Aug. 17, 1961  2 Sheets-Sheet 1

INVENTORS
THEODORE A. MILLER
HERBERT L. FOWLER
BY Oldham & Oldham
ATTYS.

April 21, 1964  T. A. MILLER ETAL  3,129,858
MEASURING AND DISPENSING APPARATUS
Filed Aug. 17, 1961  2 Sheets-Sheet 2
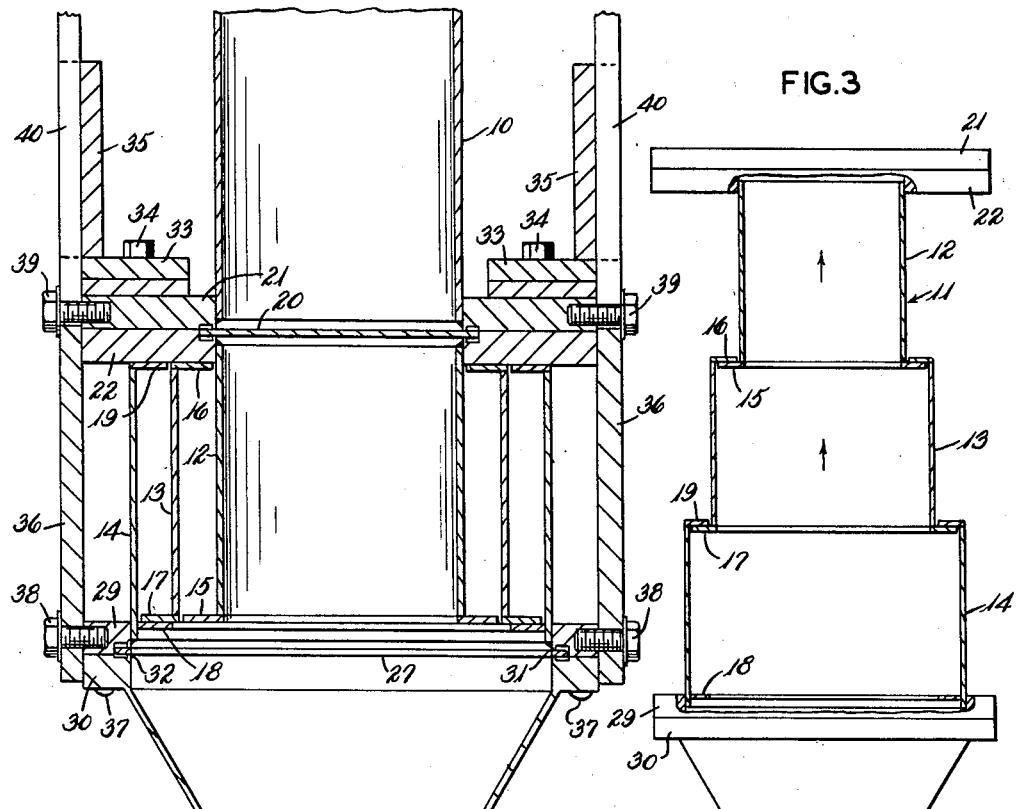
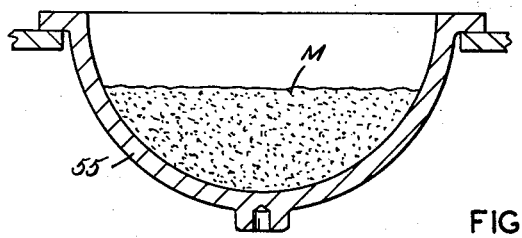
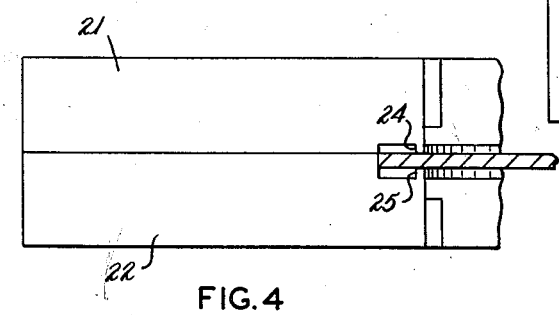
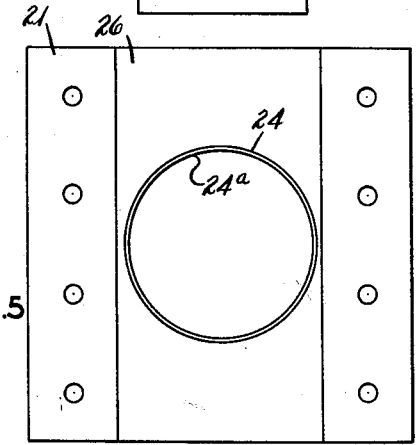
*INVENTORS*
**THEODORE A. MILLER
HERBERT L. FOWLER**
BY Oldham & Oldham
ATTYS.

:::

United States Patent Office 3,129,858
Patented Apr. 21, 1964

3,129,858
MEASURING AND DISPENSING APPARATUS
Theodore A. Miller, 861 Chestnut Blvd., Cuyahoga Falls, Ohio, and Herbert L. Fowler, Mogadore, Ohio; said Fowler assignor to said Miller
Filed Aug. 17, 1961, Ser. No. 132,176
1 Claim. (Cl. 222—439)

The invention relates to measuring and dispensing apparatus, especially to apparatus of that type used with small particulate, or granular material, or the like.

In the formation of various articles by molding or casting operations, it is necessary to measure the amounts of materials charged into the molds, in many instances. Inasmuch as a variety of different molds may be being processed in one type of apparatus, it frequently is necessary to place various quantities of the charging material into different size mold cavities. Naturally such adjustment in the quantity of material charged should be done in a rapid, accurate manner, and it is very important that the measuring and dispensing apparatus be adapted for rapid but accurate charging and unloading actions, and that the apparatus should be operative for extensive periods of time with a minimum of, or no maintenance being performed thereon.

Some types of material that are being used in forming large numbers of cast articles today are powdered polyethylene and powdered P.V.C. These materials have the characteristic that they become sticky very easily and if any appreciable frictional forces are applied thereto, or if they are received in any type of a mechanism having very much friction in the operative parts thereof, such materials, when processed, will become quite sticky, and will prevent operation of the charging or dispensing apparatus with which they may be associated.

The general object of the present invention is to provide a novel and improved measuring and dispensing apparatus characterized by the ready adjustability of the measuring and dispensing apparatus and by the accuracy of the measuring and dispensing action provided.

Another object of the invention is to provide a measuring and dispensing apparatus of the class described and where a pair of control or valve plates are positioned in spaced vertical relationship with each other for closing the top or the bottom of the measuring and dispensing chamber means formed in the apparatus, and with a unitary controlled movement of the valve plates being provided for automatically opening one end of the dispenser and closing the other for all positions permitted for the valve plates.

Another object of the invention is to provide a readily controllable, accurate measuring and dispensing chamber having a variable size and with the chamber being formed from a plurality of telescopically engaged cylindrical members having sealed engagement with each other and positioned on a vertical axis in the apparatus for charging and dispensing action by gravity.

Further objects of the invention are to provide a measuring and dispensing apparatus affixed to the bottom of a hopper member and where the hopper member is supported for conveniently controlled movement with relation to a support means or frame provided therefor; to provide a control means for a pair of valve plates whereby the valve plates may be varied in vertical relationship to each other and be retained in unitary movement relationship at any given position; to provide a control member for quickly reciprocating a pair of valve plates as a unit and for positioning them with one valve plate in open position and one valve plate in closed position at all times; to provide safety means in association with the valve plates and control members for actuation of the valve plates only when the worker is protected and has both hands operating the safety means in the apparatus; to provide a pair of guide bars in association with a plurality of telescopically engaging cylinders whereby the position of the cylinders can be controlled through the guide bars which limit the cylinders to axial telescoping movement and with the volume or size of the compartment defined thereby being readily indicated and controlled by the position of the guide bars in the assembly; and to provide a relatively uncomplicated, rapid acting measuring and dispensing apparatus particularly adapted for use with a thermoplastic powdered material, or the like; and to provide the control valve plates in the apparatus with minimum frictional type of positioning plates or means therefor.

The foregoing and other objects and advantages of the invention will be made more apparent as the specification proceeds.

Reference now is made to the accompanying drawings where:

FIG. 1 is an elevational view of apparatus forming one currently preferred embodiment of the principles of the invention;

FIG. 2 is a fragmentary enlarged horizontal section taken on line 2—2 of FIG. 1;

Figure 6:
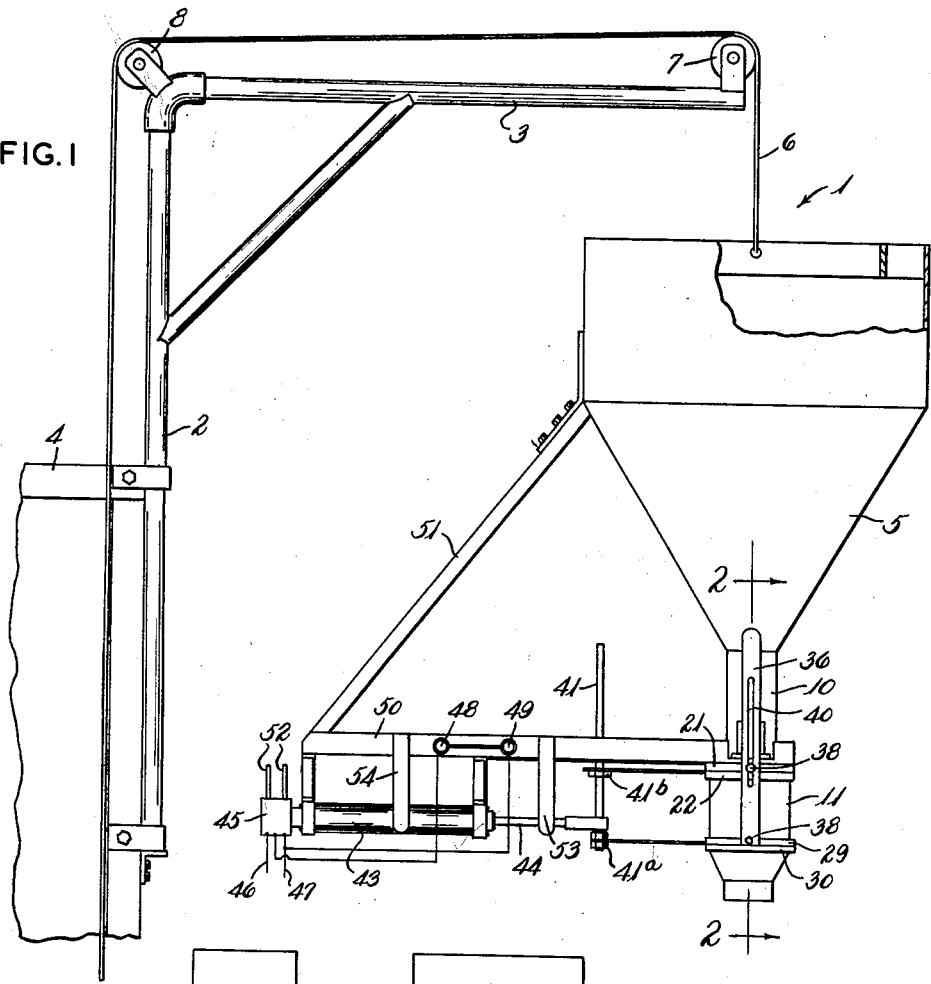
Figure 7:
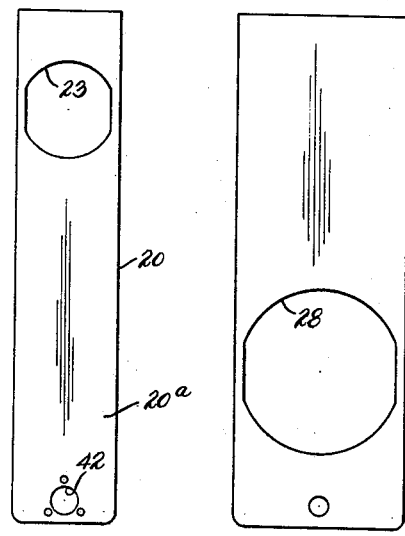

FIG. 3 of the drawings is a fragmentary vertical sectional view of the apparatus shown in FIG. 2 but with the telescopically associated cylinders forming the measuring charge compartments of the apparatus of the invention being shown in extended form;

FIG. 4 is a fragmentary enlarged vertical section taken on line 4—4 of FIG. 2 and showing the valve plate positioning means;

FIG. 5 is a plan view of one of the valve plate positioning members of the invention; and FIGS. 6 and 7 are plan views of the valve plates used in the apparatus of the invention.

When referring to corresponding members shown in the drawings and referred to in the specification, corresponding numerals are used to facilitate comparison therebetween.

Generally speaking, the present invention relates to an adjustable, quick operating measuring and dispensing means comprising a compartment means including a plurality of vertically positioned, telescopically engaged cylinders that form an adjustable size measuring compartment attachable to the material source for receiving the material therefrom by gravity action, an upper valve slidably engaging the upper end of the compartment means and having an aperture for alignment therewith and a closing section movable to engage and close the upper end of the compartment means, a lower valve plate slidably engaging the compartment means at the lower end thereof and having an aperture for alignment therewith and having a closing section movable to engage and close the lower end of the compartment means, the valve plates being positioned in parallel relationship to each other and movable on a common axis, the apertures in the valve plates being offset from each other in a horizontal direction with no overlap therebetween, a control rod engaging the valve plates for unitary movement thereof, and control means to move the valve plates from one position with one of the apertures therein aligned with the compartment means to a second position with the other of the apertures aligned with the axis of said compartment means whereby in one position the material will flow into the compartment and fill it, and in the other position the charge compartment will be emptied.

Particular attention now is directed to the details of the structure shown in the drawings, and a measuring and dispensing apparatus of the invention is indicated as a whole by the numeral 1. This apparatus has a support frame such as a pivotally positioned rod or pipe support 2 that has an overhanging, horizontally directed section 3 provided thereon. The rod is pivotally secured in any conventional manner to a support 4.

A suitable material receiving and storage dispensing member, such as a hopper 5, is adjustably secured to and supported from the rod 2, as by means of a cable 6 that is secured to the upper end of the hopper 5 and is carried on a pair of support sheaves 7 and 8 operatively carried by the rod 2 on the upper end section 3 thereof. A counterweight 9 is secured to the free end of the cable 6 to at least substantially counterbalance the weight of the hopper 5 and means positioned thereon and received therein whereby vertical and lateral movement of the hopper 5 and associated means is facilitated.

The hopper 5 has a dispensing neck or spout 10 provided at the lower end thereof and material normally will flow therefrom by gravity action. Any suitable amount of material to be dispensed can be received in the hopper 5 which naturally is made of a desired size for receiving a substantial quantity of the material to be stored and dispensed by the apparatus of the invention.

As an important feature of the present invention, an adjustable compartment means 11 is operatively secured to the lower end of the discharge neck 10 for receiving powdered material or other substance stored in the hopper by gravity action and where the material can flow freely from the discharge spout or neck directly into the compartment means 11 for filling it. The compartment means 11 includes a plurality of vertically positioned, telescopically engaged cylinders such as an inner, middle, and outer cylinder 12, 13 and 14, respectively. Usually the innermost cylinder 12 is of the same diameter as the discharge neck 10 and is connected thereto in an operative manner, as hereinafter described in more detail. FIGS. 2 and 3 of the drawings best show that the inner cylinder 12 has a radially outwardly extending flange 15 formed at the lower end thereof, and with an inwardly extending flange 16 provided at the upper end of the intermediate cylinder 13 being adapted to engage with such flange 15 as the cylinders 12, 13 and 14 are moved axially outwardly with relation to each other and when the cylinder 13 is in its completely extended position. The intermediate cylinder 13 also has a substantially radially outwardly extending flange 17 formed on, or secured to its lower end and extending therefrom for engagement with a support flange 18 carried by and extending inwardly from the outer or larger cylinder 14 adjacent its lower end. When the cylinders have been moved with relation to each other until the intermediate cylinder 13 is completely extended, then further axailly outward telesecopic movement of the cylinders will permit the outer cylinder 14 to move axially outwardly until a flange 19 provided at its upper end and extending inwardly therefrom engages the support flange 17 and prevent further extension of the compartment means 11. All of these flanges 15, 16, 17, 18 and 19 are in the form of annular rings and do not interfere with telescopic movement of the cylinders 12, 13 and 14 except to limit such relative telescopic movement therebetween in the manner outlined hereinabove. Thus the compartment means 11 normally has a relatively small upper end and a large lower end, although it is possible to vary the relationship between such large and small ends dependent upon the compartment filling and discharge action desired, but the construction of the invention has been quite satisfactory in use and embodies the currently preferred construction of the invention.

An upper valve plate 20 is operatively and slidably associated with the upper end of the compartment means, as by a pair of positioning plates 21 and 22. Such upper valve plate 20 has one generally annular aperture 23 provided therein which aperture is of a size of the lower end of the discharge neck 10, and the valve plate 20 is positioned for alignment of the aperture 23 with the axis of the discharge neck. The valve plate 20 also has a solid closing section, or portion 20a so that the valve plate, by a sliding action relative to the discharge neck, can be slid into a closed position to close or seal off the upper end of the compartment means with relation to any material received in the hopper 5. So as to support the valve plate 20 to have minimum interference between the material being dispensed, the valve plate, and its positioning means, upon rapid reciprocating movement of the valve plate 20, each of the positioning plates 21 and 22 has an annular bead, or raised lip 24 and 25, respectively, provided thereon immediately adjacent the margins of an annular hole provided in each of these positioning plates 21 and 22, such as a hole 24a in the plate 21, to outline the center apertures therein. A groove 26 is formed adjacent each of these beads 24 and 25 and it extends longitudinally of the positioning plates. The grooves 26 combine to form a space to receive the upper valve plate and slidably position it for only axial movement. The positioning plates 21 and 22 are clamped onto the plate 20 whereby only a minimum frictional area is provided for setting up friction between the valve plate 20 and its positioning plates. It has particularly been found that this specific mounting of the valve plates has provided a minimum interference between the material being processed and the required action for the valve plates for compartment filling and discharge action. Many of these materials being processed, such as polyethylene powders, become sticky very easily and can gum up the apparatus to such an extent that the valve plate 20 would not be free for its sliding movement from compartment filling to compartment sealing positions, if ordinary mounting means would be provided therefor.

Usually the valve plate 20 is spaced slightly both from the lower end of the discharge neck 10 and from the upper end of the smaller or inner cylinder 12, as indicated in the drawings. A lower valve plate 27, having an aperture 28 therein of a size to align with the lower end of the compartment means as formed by the lower end of the outermost cylinder 14, is also present in the apparatus and is confined between a pair of positioning plates 29 and 30 of the same construction, as the positioning plates 21 and 22. Ribs or beads 31 and 32 are formed on the positioning plates 29 and 30 immediately adjacent the apertures therein for limited contact area with the lower valve plate 27 to position it in a manner similar to the upper valve plate 20 for only axial sliding movement.

The relative positions of the various cylinders forming the compartment means 11 can be controlled in a suitable manner, and to this end, a device, such as an L-shaped bracket 33, is shown secured to the positioning plate 21 at each lateral margin thereof by a member, such as a cap screw 34. The bracket 33 has a U-shaped vertically extending guide section 35 formed thereon and facing outwardly of the compartment means 11 at opposite margins thereof for slidably receiving means, such as a pair of guide bars 36 individually received in the guide sections for vertical movement.

The positioning plates 21 and 22 are secured together in any suitable manner, as by bolts or cap screws, not shown, and screws 37 may secure the positioning plates 29 and 30 together. The effective lengths of the compartment means 11 is hence controlled by securing the lower end of the guide bars 36 to the lower positioning plate assembly by cap screws 38 while set screws 39, or the like extend through vertically extending slots 40 provided in the guide bars 36 to secure the guide bars 36 and hence the various cylinders 12, 13 and 14 together in desired relationship in either completely collapsed, or in partially or fully extended form, as desired.

In order to provide unitary movement of the valve plates 20 and 27, a control rod 41 is present in the apparatus. In the present embodiment of the invention, this control rod, means or member is shown secured to the lower valve plate 27, as by lock nuts 41a, but with the rod extending through an aperture 42 formed in the upper valve plate 20. A slide nut 41b may be carried by the control rod 41 and be secured to the valve plate 20. Thus when the vertical or overall height or size of the compartment means 11 is varied, such difference in vertical length of the compartment means or members is automatically compensated for by the control rod 41 sliding in the aperture 42 in the upper valve plate 20 so that unitary movement of the valve plates is still obtained. These valve plates are positioned in parallel relationship to each other and are adapted to be moved only in a direction parallel to or on the axes of these valve plates. The valve plates are so positioned in the apparatus that the aperture 23 in the valve plate 20 is always horizontally offset from the aperture 28 in the lower valve plate 27. Thus one of the apertures 23 or 28, at each extremity of movement provided for the valve plates, is adapted to align with the axis of the discharge neck 10.

Controlled reciprocating movement of the valve plates and means associated therewith is provided by conventional apparatus and in this instance, an air motor 43 is used. This air motor 43 has a cylinder with a piston rod 44 extending therefrom. Piston rod 44 has an end block 44a secured thereto that slidably engages the control rod 41 to move such control rod with the piston rod 44. The air motor or cylinder 43 is controlled, as by a solenoid 45, which has power supply leads 46 and 47 connecting thereto. Power is only supplied to the control solenoid 45 when a pair of safety switches 48 and 49 carried on a frame means 50 operatively associated with the compartment means 10 and secured to the hopper 6, as by a positioning bracket 51, are closed. Air is supplied to the control solenoid 45 through conduits, or lines 52 from a suitable source of compressed air. Hence when actuation of the valve plates is desired, the operator merely needs to depress both control switches 48 and 49, which switches are spaced far enough apart as to require both hands of the operator to be located there. The operator can swing and pull the hopper and associated means into position by handles or the like 53 and 54 on the sub-frame 50 so that he normally is grasping this part of the apparatus and to align the compartment means with a member, such as a mold half 55 for deposit of a charge of material M thereinto.

It will be seen that the apparatus of the invention can be readily and easily adjusted to dispense different quantities of material, as all one needs to do is to loosen the set screws 39 and permit the guides 36 to move vertically the desired distance and the compartment means 11 will be set for functioning with the desired volume of charge therein. The desired volumes of charges naturally can be suitably indicated on the guide bars 36 by any conventional indicia provided thereon either to represent the charge quantity by volumetric measurement, or by merely indicating the charge by the type of mold to be used, etc.

The material to be dispensed will rapidly drop from the hopper 5 into the compartment means 10, and the valve plates 20 and 27 will have substantially instantaneous movement from one extreme position to another. Thus it is possible to have as many as 60 cycles per minute in the apparatus of the invention, but actually to align it with a mold and to make any other actions required, the operative cycle usually will be appreciably less than 60 times per minute. The apparatus, in tests, has been accurate in measuring a 100 gram charge, to ½ of 1%. In all events, an easily controlled accurate measuring and dispensing unit has been provided and it will process a variety of powdered or granular solids including thermoplastic powders which are easily rendered sticky without any damage or injury to the powder or the apparatus so that it can function effectively for a long service life. Thus the objects of the invention are believed to be achieved.

While one complete embodiment of the invention has been disclosed herein, it will be appreciated that modification of this particular embodiment of the invention may be resorted to without departing from the scope of the invention as defined in the appended claim.

What is claimed is:

Apparatus for measuring and dispensing flowable, thermoplastic materials including a hopper, a vertically telescoping compartment secured to the bottom of the hopper, a first slide positioned substantially horizontally between the hopper and the compartment, said first slide having an opening therethrough in a compartment charging position of the slide, a second slide positioned substantially horizontally and closing the bottom of the compartment, said second slide having an opening therethrough in a compartment discharging position of the slide, the openings in the slides being horizontally offset from each other, a substantially vertically extending rod secured to one slide and passing in sliding engagement through the other, means for vertically adjusting the height of the compartment and thereby its size and to change the vertical distance between the slides, means engaging the rod regardless of the vertical distance between the slides to move the rod laterally to operate the slides simultaneously to and from compartment charging and compartment discharging positions, and positioning means for each slide which slidably engage with the sides of each slide at only three points, namely, the side edge of each slide, the top of the slide on a line parallel to the side edge but spaced laterally therefrom, and on the bottom of the slide on a line opposed to the last-mentioned line whereby recesses are provided adjacent the compartment at the top and botom surfaces of said slides and the side edges of each slide are not in contact with material in the compartment so that low resistance to movement of the slides by the material being dispensed is obtained.

References Cited in the file of this patent

UNITED STATES PATENTS

| | | |
|---|---|---|
| 1,127,397 | Boyajian | Feb. 9, 1915 |
| 1,455,980 | Williams | May 22, 1923 |
| 1,891,038 | Barros | Dec. 13, 1932 |
| 2,540,259 | Haugen | Feb. 6, 1951 |